March 7, 1961 E. S. PARKS ET AL 2,973,743
COMBINATION LAMP AND WATERER
Filed June 5, 1959

INVENTORS
EDWIN S. PARKS
& HARRY A. HOLLINGSWORTH
BY
McMorrow, Berman & Davidson
ATTORNEYS

United States Patent Office 2,973,743
Patented Mar. 7, 1961

2,973,743

COMBINATION LAMP AND WATERER

Edwin S. Parks, 612 Center Ave., and Harry A. Hollingsworth, 1815 N. Finley Ave., both of Ottumwa, Iowa Filed June 5, 1959, Ser. No. 818,423

6 Claims. (Cl. 119—73)

This invention relates to a combination lamp and waterer for yards, dog houses, pens, chicken and brooder houses and the like.

The primary object of the invention is to provide a practical, and efficient device of this kind which supplies wanted light for itself and the surroundings at its location while providing drinking water which is maintained against freezing by the heat furnished by the source of illumination contained in the device.

Another object of the invention is to provide a device of the character indicated above which is simple in construction, composed of a small number of uncomplex and easily assembled parts, and which can be mass-produced from a variety of readily available materials, in rugged and attractive forms, at relatively low cost.

Other important objects and advantageous features of the invention will be apparent from the following description and the accompanying drawings, wherein, for purposes of illustration only, a specific form of the invention is set forth in detail.

Figure 1:
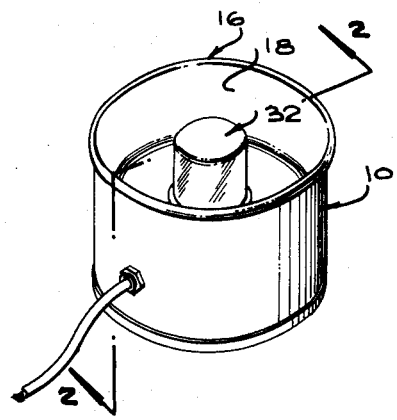
Figure 1 is a perspective view of a device of the invention.

Referring in details to the drawings, wherein like numerals designate like parts throughout the several views, the illustrated embodiment of the invention comprises a vertical hollow or tubular cylindrical open-ended stand 10 having a beaded lower end 12 of its side wall, to rest upon a supporting surface, such as the ground, or the floor, in an animal enclosure or yard, and a free upper edge 14, upon and in which is preferably removably supported a light reflector and water pan assembly, generally designated 16.

The assembly 16 comprises a circular water pan 18 having an upwardly flaring side wall 20 having on and around its free upper edge an annular laterally outwardly and downwardly directed hook flange 22, to securably and supportably engage over the upper edge 14 of the stand 10. The pan 18 further comprises a preferably flat horizontal bottom wall 24 which is joined to the lower end of the side wall 20 by an arcuate wall portion 26. The bottom wall 20, the wall portion 26 and the flaring side wall 20 together defines a floodlight reflector, and the inner surface of the pan can be polished or otherwise treated to enhance its light-reflective effect. The pan 18 can be suitably made of metal, such as aluminum, and the stand 10 of aluminum in the smaller sizes, and of galvanized tin in the larger sizes.

The pan bottom wall 24, which is provided with a central circular opening 28, is spaced at a height above the lower end 12 of the stand 10, at least sufficient to accommodate a source of light and heat, such as at least one electric light fixture 30.

Figure 2:
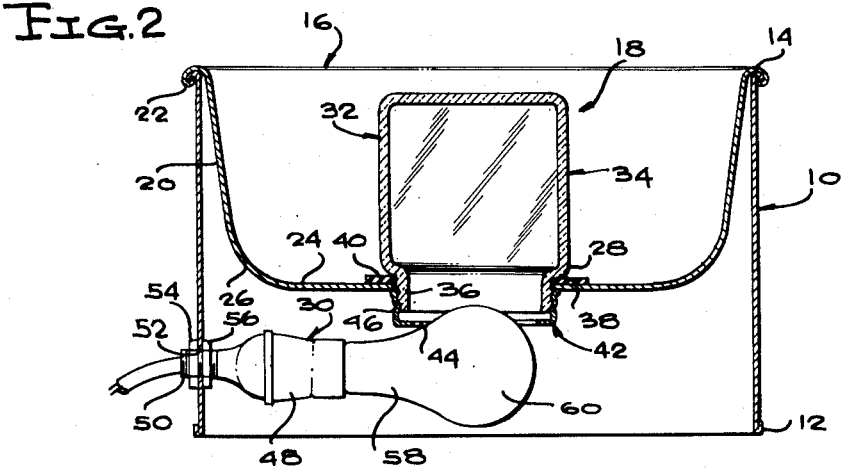
Figure 2 is an enlarged vertical transverse section, taken on the line 2—2 of Figure 1.
Figure 3:
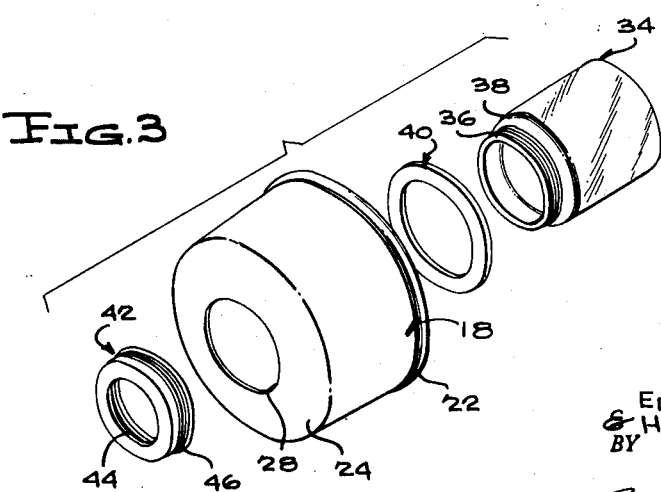
Figure 3 is an exploded perspective view of the light reflector and water pan assembly.

Mounted in the opening 28 and upstanding from the pan bottom wall 24 is a translucent light dome 32, which can conveniently and economically take the form of an ordinary glass jar 34, having a reduced, externally threaded neck 36 on its open end, the neck 36 being inserted downwardly and conformably through the opening 28, as seen in Figure 2. The neck 36 defines a shoulder 38 at the lower end of the jar 34, between which and the upper surface of the bottom wall 24 is interposed and compressed, a compressible water-sealing gasket 40.

For holding the jar 34 in place and the gasket 40 under compression, an ordinary annular jar sealing cap 42, having a central opening 44, has its side wall 46 threaded upwardly on the neck 36 and against the undersurface of the pan bottom wall 24. This arrangement makes replacement of the light dome 32 easy.

The electric light fixture 30 can take the form of a socket 48 having its neck 50 extended horizontally and radially through an opening 52 provided in the stand side wall at a point spaced below the pan 18, and locked in place by outer and inner nuts 54, 56 threaded thereon. A suitable electric light bulb 58 is threaded in the socket 48 so as to have its globular portion 60 in vertical axial alignment with the vertical centerline of the light dome 32. The globular portion 60 is preferably partly extended upwardly through the opening of the sealing cap 42, so as to produce maximum propagation of its light and heat up into the dome 32. It has been ascertained that sufficient lighting of the light dome 32 is thus produced to have a substantial floodlight projected upwardly from the pan 18, through drinking water present therein, and that sufficient heating of the water is produced to prevent its becoming frozen at below zero temperatures. Flood lighting of the area of the location of the device not only facilitates finding and use of the device by animals for drinking purposes, but provides a thief discouraging effect, as well as sufficient light for inspection and servicing of the area.

Water can be supplied to the pan 18 in any desired manner by hand, or by connecting a supply hose thereto from any suitable source, so that the supply of water is float valve controlled, and thermostatic control for the bulb 58 can also be provided.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A combination lamp and waterer comprising a vertical tubular stand having an upper end and a lower end, a light reflector and water pan assembly supported on the upper end of and extending downwardly within the stand, said assembly comprising a pan having a bottom wall provided with an opening, said bottom wall being spaced above the lower end of the stand, a translucent light dome located within the pan and having an open lower end registered with said opening, means securing and water-sealing the lower end of the dome in said opening, and a source of light and heat mounted on the stand below the pan and registered with the open lower end of the light dome.

2. A combination lamp and waterer comprising a vertical tubular stand having an upper end and a lower end, a light reflector and water pan assembly supported on the upper end of and extending downwardly within the stand, said assembly comprising a pan having a bottom wall provided with an opening, said bottom wall being spaced above the lower end of the stand, a translucent light dome located within the pan and having an open lower end registered with said opening, means securing and water-sealing the lower end of the dome in said opening, and a source of light and heat mounted on the stand below the pan and registered with the open lower end of the light dome, said dome having a reduced externally threaded neck forming its open lower end and extending downwardly through the pan bottom wall opening, said neck defining a shoulder on the dome above the pan bottom wall, a sealing gasket circumposed on the neck between the shoulder and the pan bottom wall, and an annular cap having a side wall threaded upwardly on the neck and against the pan bottom wall and compressing the gasket between said shoulder and the pan bottom wall, said cap having a central opening registered with the open lower end of the light dome.

3. A combination lamp and waterer comprising a vertical tubular stand having an upper end and a lower end, a light reflector and water pan assembly supported on the upper end of and extending downwardly within the stand, said assembly comprising a pan having a bottom wall provided with an opening, said bottom wall being spaced above the lower end of the stand, a translucent light dome located within the pan and having an open lower end registered with said opening, means securing and water-sealing the lower end of the dome in said opening, and a source of light and heat mounted on the stand below the pan and registered with the open lower end of the light dome, said dome having a reduced externally threaded neck forming its open lower end and extending downwardly through the pan bottom wall opening, said neck defining a shoulder on the dome above the pan bottom wall, a sealing gasket circumposed on the neck between the shoulder and the pan bottom wall, and an annular cap having a side wall threaded upwardly on the neck and against the pan bottom wall and compressing the gasket between said shoulder and the pan bottom wall, said cap having a central opening registered with the open lower end of the light dome, said source comprising an electric light fixture having a socket mounted horizontally on the side wall of the stand, and an electric light bulb threaded in the socket and having its globular portion registered with the cap opening.

4. A combination lamp and waterer device comprising a heat conductive water pan having a bottom wall and an upstanding sidewall, means for supporting said pan with its bottom wall spaced above a supporting surface for the device, said pan bottom wall having a central opening therethrough, a translucent light dome larger in diameter than said opening, said dome being located within the pan and having a reduced neck on its lower end extending downwardly through said opening, said dome resting upon the pan bottom wall around said opening, means securing and sealing said neck in said opening, and a source of light and heat positioned beneath the pan and supported in registry with said neck.

5. In combination, a hollow vertical stand having an open upper and an open lower end and a substantially imperforate side wall, a water pan having a bottom wall and an upstanding sidewall, means engaged with the stand sidewall and mounting the pan within the stand with its bottom wall spaced above the lower end of the stand, the pan bottom wall having a central opening, a translucent dome having an open neck on its lower end, said dome being positioned within the pan with its neck extending downwardly through said opening, means holding said neck in said opening and sealing the opening around the neck, and a source of light and heat located in the space between the pan bottom wall and the lower end of the stand, said source being mounted on the stand and registered with the neck of the dome.

6. In combination, a hollow vertical stand having an open upper and an open lower end and a substantially imperforate side wall, a water pan having a bottom wall and an upstanding sidewall, means engaged with the stand sidewall and mounting the pan within the stand with its bottom wall spaced above the lower end of the stand, the pan bottom wall having a central opening, a translucent dome having an open neck on its lower end, said dome being positioned within the pan with its neck extending downwardly through said opening, means holding said neck in said opening and sealing the opening around the neck, and a source of light and heat located in the space between the pan bottom wall and the lower end of the stand, said source being mounted on the stand and registered with the neck of the dome, said dome being larger in diameter than said opening, said holding means comprising screw threads on said neck, and an annular cap threaded on the neck and bearing against the underside of the pan bottom wall.

References Cited in the file of this patent

UNITED STATES PATENTS

| | | |
|---|---|---|
| 1,579,305 | Goldberg | Apr. 6, 1926 |
| 1,681,040 | Kemp | Aug. 14, 1928 |
| 2,177,101 | Franzwa | Oct. 24, 1939 |
| 2,519,736 | Bradley | Aug. 22, 1950 |